(12) United States Patent
Katz et al.

(10) Patent No.: US 11,854,227 B2
(45) Date of Patent: Dec. 26, 2023

(54) DEPTH-FROM-STEREO BENDING CORRECTION USING VISUAL INERTIAL ODOMETRY FEATURES

(71) Applicant: Snap Inc., Santa Monica, CA (US)

(72) Inventors: Sagi Katz, Yokneam Ilit (IL); Matthias Kalkgruber, Vienna (AT)

(73) Assignee: SNAP INC., Santa Monica, CA (US)

( * ) Notice: Subject to any disclaimer, the term of this patent is extended or adjusted under 35 U.S.C. 154(b) by 93 days.

(21) Appl. No.: 17/480,405

(22) Filed: Sep. 21, 2021

(65) Prior Publication Data

US 2022/0366600 A1 Nov. 17, 2022

Related U.S. Application Data

(60) Provisional application No. 63/188,815, filed on May 14, 2021.

(51) Int. Cl.
| | |
|---|---|
| *G06T 7/33* | (2017.01) |
| *G06T 7/73* | (2017.01) |
| *G06T 7/593* | (2017.01) |
| *G06T 19/00* | (2011.01) |
| *H04N 13/239* | (2018.01) |

(52) U.S. Cl.
CPC ............... *G06T 7/74* (2017.01); *G06T 7/33* (2017.01); *G06T 7/593* (2017.01); *G06T 19/006* (2013.01); *G06T 2207/10012* (2013.01); *H04N 13/239* (2018.05)

(58) Field of Classification Search
None
See application file for complete search history.

(56) References Cited

U.S. PATENT DOCUMENTS

| | | | |
|---|---|---|---|
| 8,576,143 B1 | 11/2013 | Kelly | |
| 2015/0316767 A1* | 11/2015 | Ebstyne | .................. G06T 7/80 345/8 |
| 2018/0108150 A1* | 4/2018 | Curtis | ................. H04N 13/246 |

(Continued)

FOREIGN PATENT DOCUMENTS

WO 2022240933 11/2022

OTHER PUBLICATIONS

"International Application Serial No. PCT US2022 028688, International Search Report dated Oct. 18, 2022", 5 pgs.

(Continued)

*Primary Examiner* — Steven Z Elbinger
(74) *Attorney, Agent, or Firm* — SCHWEGMAN LUNDBERG & WOESSNER, P.A.

(57) ABSTRACT

A method for correcting a bending of a flexible device is described. In one aspect, the method includes accessing feature data of a first stereo frame that is generated by stereo optical sensors of the flexible device, the feature data generated based on a visual-inertial odometry (VIO) system of the flexible device, accessing depth map data of the first stereo frame, the depth map data generated based on a depth map system of the flexible device, estimating a pitch-roll bias and a yaw bias based on the features data and the depth map data of the first stereo frame, and generating a second stereo frame after the first stereo frame, the second stereo frame based on the pitch-roll bias and the yaw bias of the first stereo frame.

20 Claims, 16 Drawing Sheets

(56) References Cited

U.S. PATENT DOCUMENTS

2021/0082086 A1* 3/2021 Bichu .................. G06T 7/33

OTHER PUBLICATIONS

"International Application Serial No. PCT US2022 028688, Written Opinion dated Oct. 18, 2022", 6 pgs.
Timo, Hinzmann, "Flexible Stereo: Constrained, Non-rigid, Wide-baseline Stereo Vision for Fixed-wing Aerial Platforms", arxiv.org, Cornell University Library, 201 Olin Library Cornell University Ithaca, NY 14853, (Dec. 19, 2017), 8 pgs.

* cited by examiner

DEPTH-FROM-STEREO BENDING CORRECTION USING VISUAL INERTIAL ODOMETRY FEATURES

CLAIM OF PRIORITY

The present application claims priority to U.S. Provisional Patent Application Ser. No. 63/188,815, filed May 14, 2021, which is hereby incorporated by reference in its entirety.

TECHNICAL FIELD

The subject matter disclosed herein generally relates to a visual tracking system. Specifically, the present disclosure addresses systems and methods for mitigating bending effects in visual-inertial tracking systems.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. The motion tracking system is typically factory calibrated (based on predefined relative positions between the cameras and other sensors) to accurately display the virtual content at a desired location relative to its environment. However, factory calibration parameters can drift over time as the user wears the AR/VR device due to mechanical stress and temperature changes in the AR/VR device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
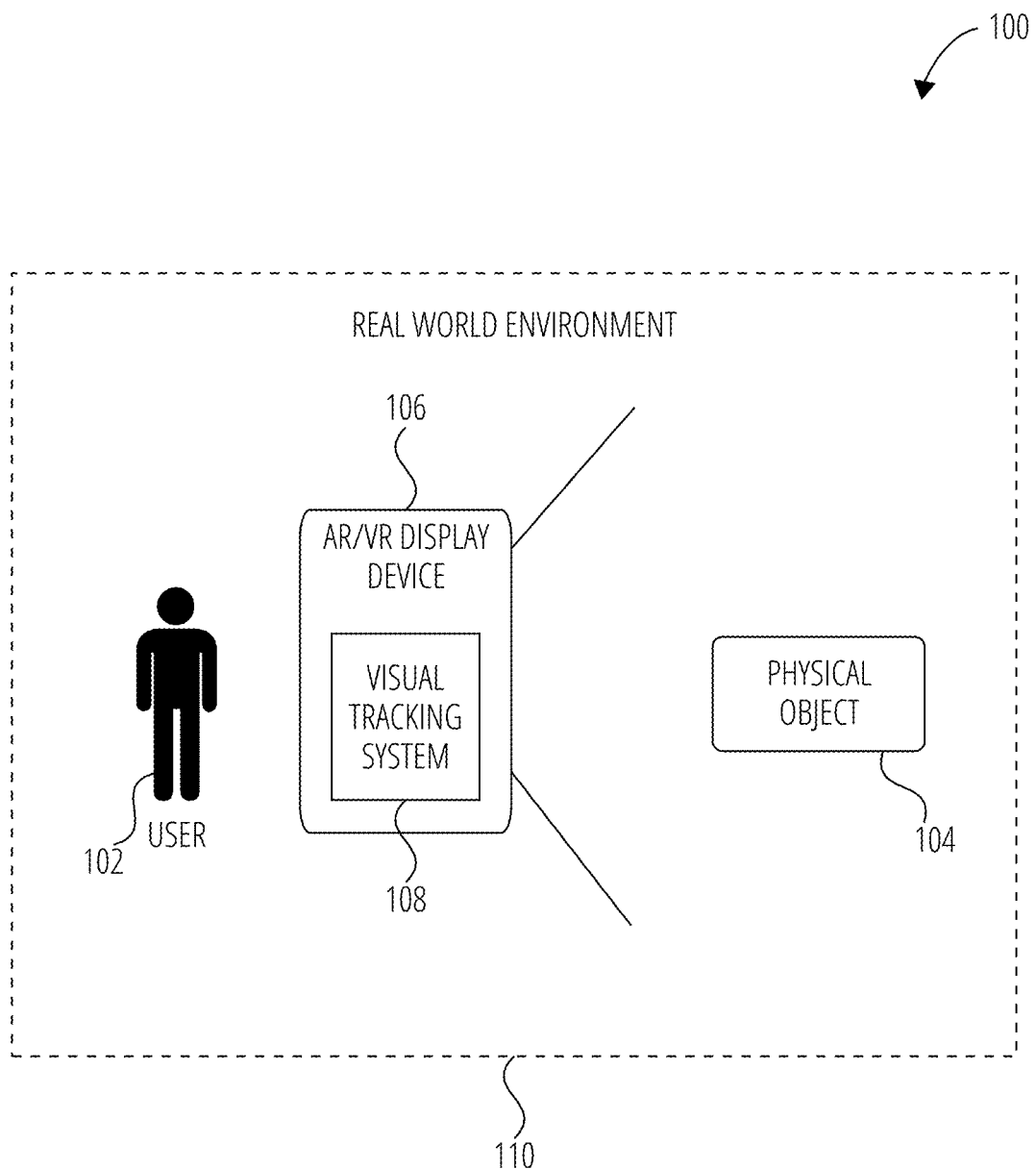
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "flexible device" is used herein to refer to a device that is capable of bending without breaking. Non-limiting examples of flexible devices include: head-worn devices such as glasses, flexible display devices such as AR/VR glasses, or any other wearable devices that are capable of bending without breaking to fit a body part of the user.

Both AR and VR applications allow a user to access information, such as in the form of virtual content rendered in a display of an AR/VR display device (also referred to as a display device, flexible device, flexible display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest). To do this, the AR display device detects the physical object and tracks a pose of the AR display device relative to the position of the physical object. A pose identifies a position and orientation of the display device relative to a frame of reference or relative to another object. For VR, the virtual object appears at a location based on the pose of the VR display device. The virtual content is therefore refreshed based on the latest pose of the device. A visual tracking system at the display device determines the pose of the display device.

Flexible devices that include a visual tracking system can operate on stereo vision using two cameras that are mounted on the flexible device. For example, one camera is mounted to a left temple of a frame of the flexible device, and another camera is mounted to the right temple of the frame of the flexible device. However, the flexible device can bend to accommodate different user head sizes. As such, the bending can result in undesirable shift (away from factory calibrated configuration) in the stereo images that can lead to errors in depth sensing using the shifted stereo images.

One method to compensate for the bending is to match features per frame on a left image and a right image and optimizing a symmetrical model (where cameras are rotated in a symmetrical manner so that only three angles are left to be solved). However, such per-frame optimization can result in additional computation time. Furthermore, the per-frame optimization is more suitable for outdoor environments where the distant features can be used for anchoring. In contrast, for indoor settings, objects are typically closer to the flexible device and thus the yaw estimation may be unstable.

The present application describes a method for estimating and compensating for the bending of flexible stereo-to-depth devices by using VIO stereo matches to validate rectification. In one example, the method includes validating the rectification by "projecting" stereo VIO features from the "native" camera to a rectified coordinate system, and triggering a bending compensation process when the VIO matches do not lie on a same raster line.

In one example embodiment, a method for correcting a bending of a flexible device is described. In one aspect, the method includes accessing feature data of a first stereo frame that is generated by stereo optical sensors of the flexible device, the feature data generated based on a VIO system of the flexible device, accessing depth map data of the first stereo frame, the depth map data generated based on a depth map system of the flexible device, estimating a pitch-roll bias and a yaw bias based on the features data and the depth map data of the first stereo frame, and generating a second stereo frame after the first stereo frame, the second stereo frame based on the pitch-roll bias and the yaw bias of the first stereo frame.

As a result, one or more of the methodologies described herein facilitate solving the technical problem of inaccurate depth sensing from stereo extraction of a flexible device. In other words, the bending of the flexible device causes errors in the depth sensing. The presently described method provides an improvement to an operation of the functioning of a computing device by rectifying the depth map from a flexible stereo-to-depth device that is bent. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. A user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 includes a flexible device. In one example, the flexible device includes a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR display device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR/VR display device 106 includes an AR application that generates virtual content based on images detected with the camera of the AR/VR display device 106. For example, the user 102 may point a camera of the AR/VR display device 106 to capture an image of the physical object 104. The AR application generates virtual content corresponding to an identified object (e.g., physical object 104) in the image and presents the virtual content in a display of the AR/VR display device 106.

The AR/VR display device 106 includes a visual tracking system 108. The visual tracking system 108 tracks the pose (e.g., position and orientation) of the AR/VR display device 106 relative to the real world environment 110 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor. The visual tracking system 108 can include a VIO system. In one example, the AR/VR display device 106 displays virtual content based on the pose of the AR/VR display device 106 relative to the real world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 8 to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
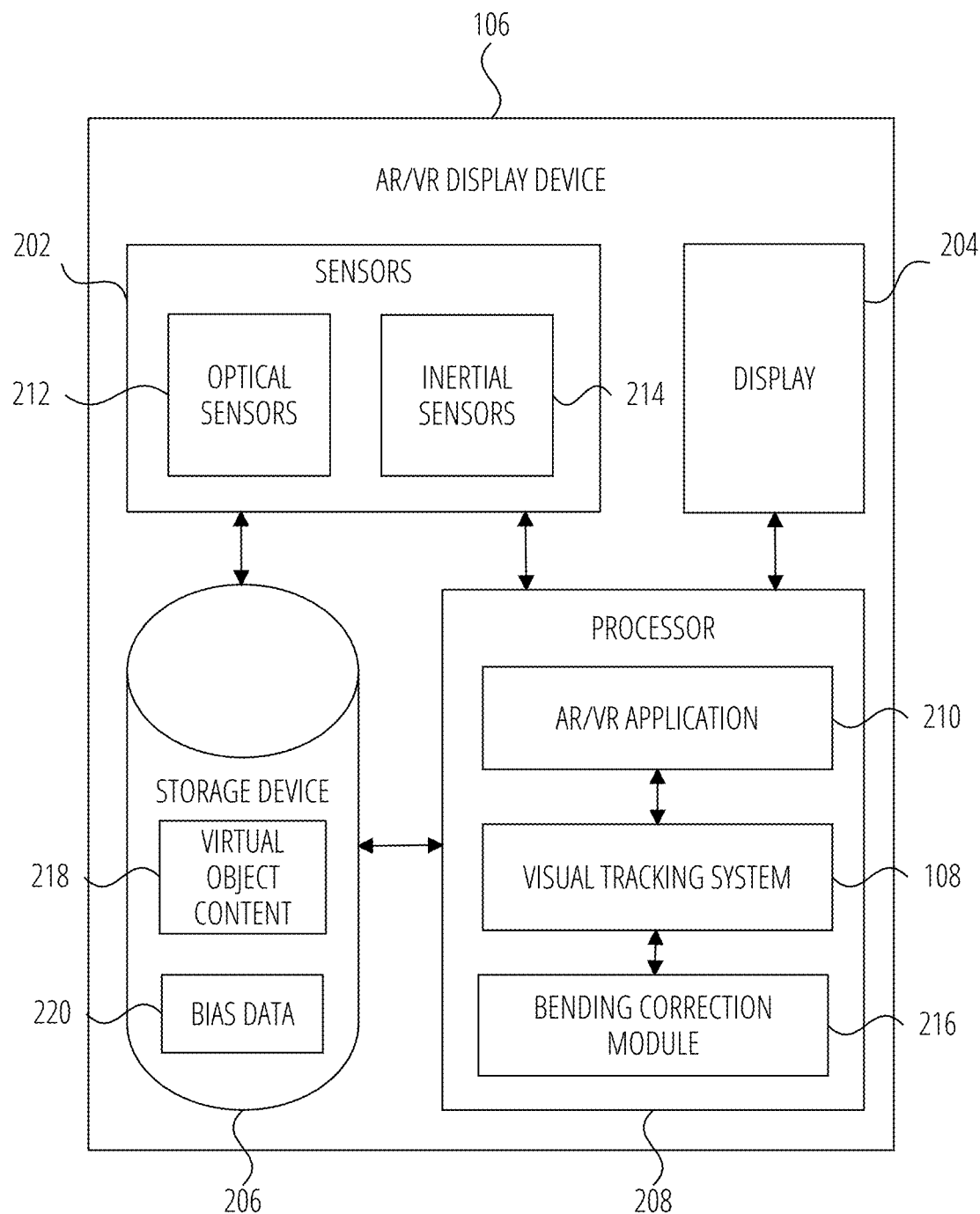
FIG. 2 is a block diagram illustrating an AR/VR display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 208, and a storage device 206. Examples of AR/VR display device 106 include a wearable computing device, a desktop computer, a vehicle computer, a tablet computer, a navigational device, a portable media device, or a smart phone.

The sensors 202 include, for example, an optical sensors 212 (e.g., camera such as a color camera, a thermal camera, a depth sensor and one or multiple grayscale, global shutter tracking cameras) and an inertial sensors 214 (e.g., gyroscope, accelerometer). Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 208 includes an AR/VR application 210, a visual tracking system 108, and a bending correction module 216. The AR/VR application 210 detects and identifies a physical environment or the physical object 104 using computer vision. The AR/VR application 210 retrieves a virtual object (e.g., 3D object model) based on the identified physical object 104 or physical environment. The AR/VR application 210 renders the virtual object in the display 204. For an AR application, the AR/VR application 210 includes a local rendering engine that generates a visualization of a virtual object overlaid (e.g., superimposed upon, or otherwise displayed in tandem with) on an image of the physical object 104 captured by the optical sensors 212. A visualization of the virtual object may be manipulated by adjusting a position of the physical object 104 (e.g., its physical location, orientation, or both) relative to the optical sensors 212. Similarly, the visualization of the virtual object may be manipulated by adjusting a pose of the AR/VR display device 106 relative to the physical object 104. For a VR application, the AR/VR application 210 displays the virtual object in the display 204 at a location (in the display 204) determined based on a pose of the AR/VR display device 106.

The visual tracking system 108 estimates a pose of the AR/VR display device 106. For example, the visual tracking system 108 uses image data and corresponding inertial data from the optical sensors 212 and the inertial sensors 214 to track a location and pose of the AR/VR display device 106 relative to a frame of reference (e.g., real world environment 110). In one example, the visual tracking system 108 includes a VIO system as previously described above.

The bending correction module 216 accesses VIO data from the VIO of the visual tracking system 108 to estimate a pitch-roll bias and yaw bending bias. The bending correction module 216 rectifies the biases to mitigate any depth-sensing errors from the bending. In one example embodiment, the bending correction module 216 estimates and compensates the bending of flexible stereo-to-depth devices by using VIO stereo matches to validate rectification. The bending correction module 216 validates the rectification by "projecting" stereo VIO features from the "native" camera to a rectified coordinate system. The bending correction module 216 triggers a bending compensation process when the VIO matches do not lie on the same raster line. Example components of the bending correction module 216 are described in more detail below with respect to FIG. 4.

The storage device 206 stores virtual object content 218 and bias data 220. The bias data 220 include values of the estimated pitch-roll bias and yaw bending bias of the AR/VR display device 106. The virtual object content 218 includes, for example, a database of visual references (e.g., images) and corresponding experiences (e.g., three-dimensional virtual objects, interactive features of the three-dimensional virtual objects).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
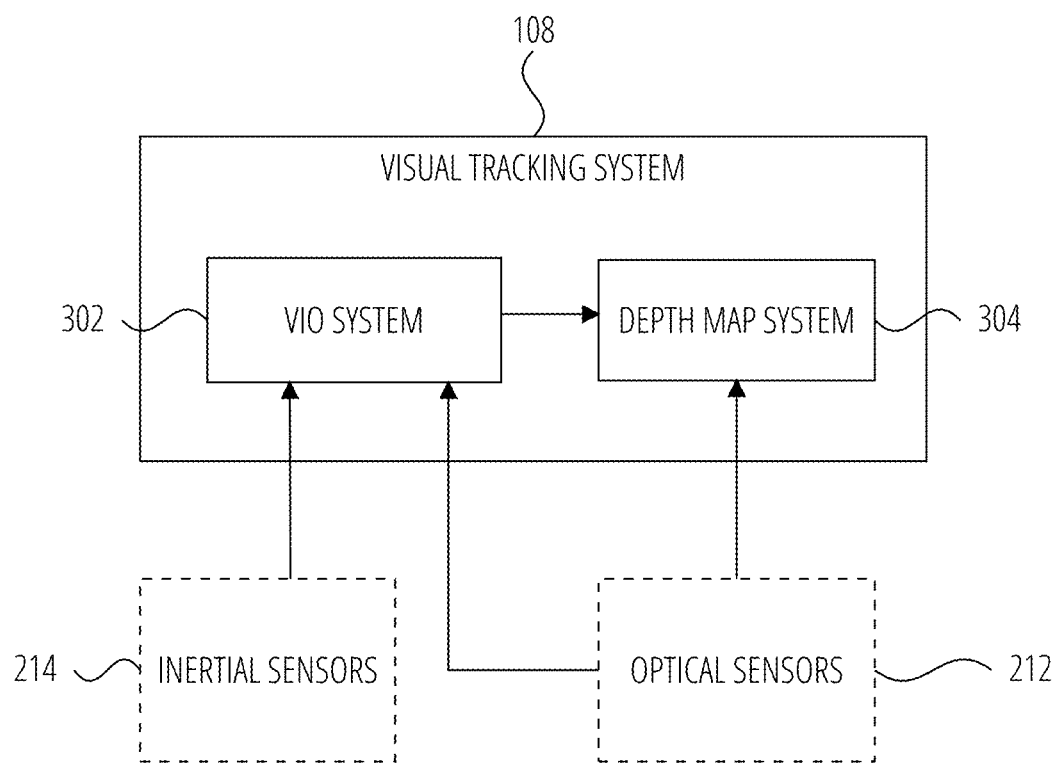
FIG. 3 is a block diagram illustrating a visual tracking system in accordance with one example embodiment.

FIG. 3 illustrates the visual tracking system 108 in accordance with one example embodiment. The visual tracking system 108 includes, for example, a VIO system 302 and a depth map system 304. The VIO system 302 accesses inertial sensor data from the inertial sensors 214 and images from the optical sensors 212.

The VIO system 302 determines a pose (e.g., location, position, orientation) of the AR/VR display device 106 relative to a frame of reference (e.g., real world environment 110). In one example embodiment, the VIO system 302 estimates the pose of the AR/VR display device 106 based on 3D maps of feature points from images captured with the optical sensors 212 and the inertial sensor data captured with the inertial sensors 214.

The depth map system 304 accesses image data from the optical sensors 212 and generates a depth map based on the VIO data (e.g., feature points depth) from the VIO system 302. For example, the depth map system 304 generates a depth map based on the depth of matched features between a left image (generated by a left side camera) and a right image (generated by a right side camera). In another example, the depth map system 304 is based on triangulation of element disparities in the stereo images.

Figure 4:
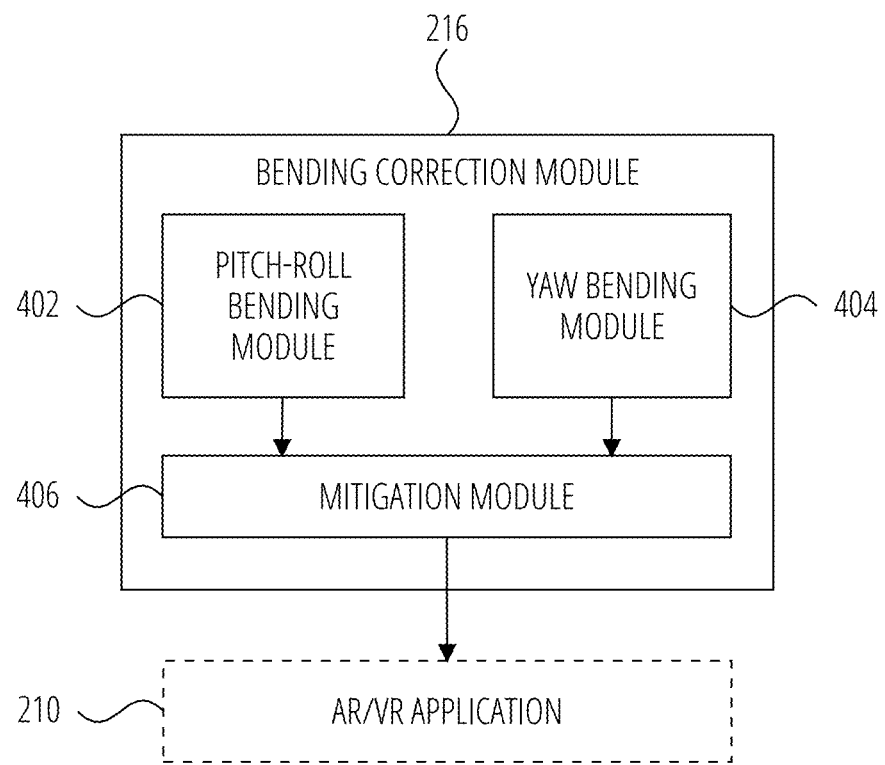
FIG. 4 is a block diagram illustrating a bending correction module in accordance with one example embodiment.

FIG. 4 is a block diagram illustrating a bending correction module 216 in accordance with one example embodiment. The bending correction module 216 includes a pitch-roll bending module 402, a yaw bending module 404, and a mitigation module 406.

The pitch-roll bending module 402 determines whether the mitigation module 406 is to rectify a bending that results in a pitch or roll deviation of the flexible device. In one example, the pitch-roll bending module 402 projects stereo VIO features from the optical sensors 212 to a rectified coordinate system. The pitch-roll bending module 402 triggers the mitigation module 406 when VIO features matches do not lie on the same raster line.

The yaw bending module 404 determines whether the mitigation module 406 is to rectify a bending that results in a yaw deviation of the flexible device. In one example, the yaw bending module 404 estimates the yaw bias by accessing 3D landmarks determined by the VIO to obtain a wide baseline with temporal consistency.

The mitigation module 406 minimizes pitch-roll bias and yaw bias based on the estimates provided by the pitch-roll bending module 402 and the yaw bending module 404. For example, the mitigation module 406 is able to minimize yaw bias between the VIO depth and the stereo-depth algorithm results by correcting the yaw estimation. The corrected configuration is then communicated to the AR/VR application 210 for display content based the corrected configuration.

Figure 5:
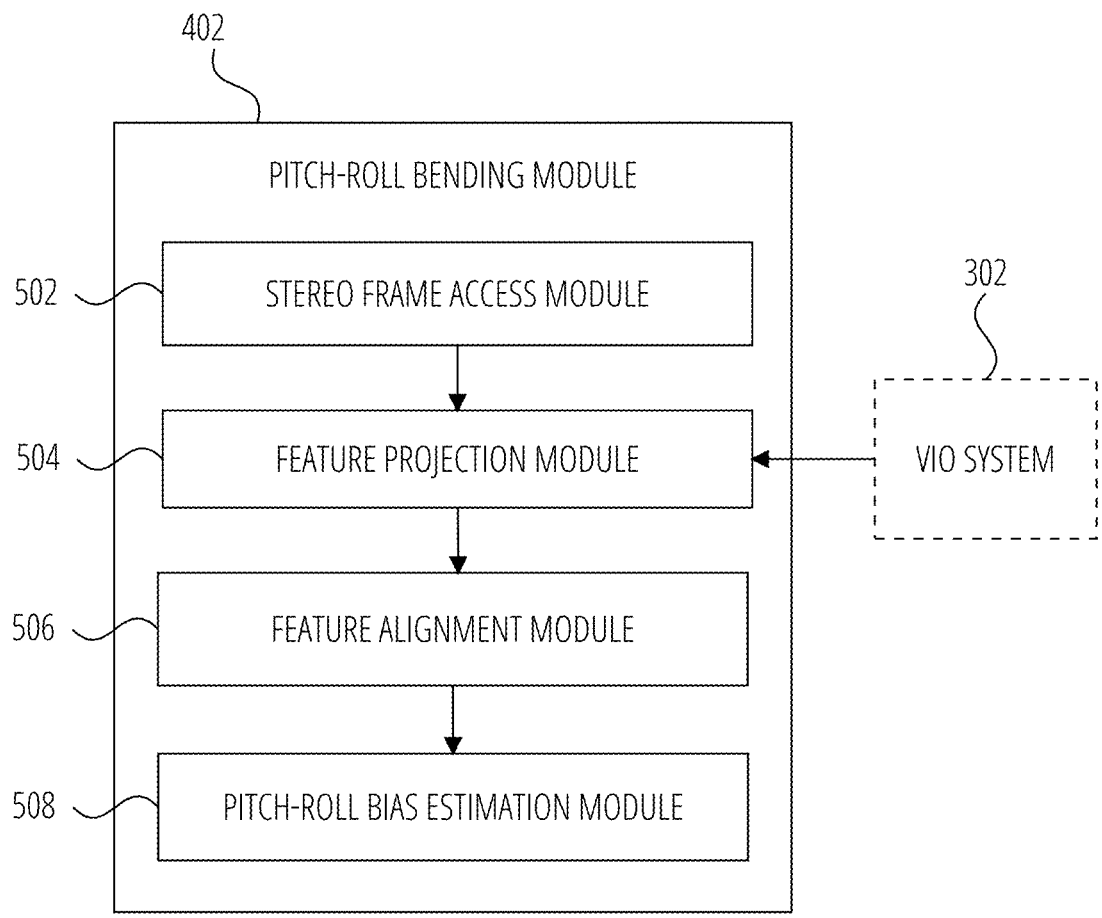
FIG. 5 is a block diagram illustrating a pitch-roll bending module in accordance with one example embodiment.

FIG. 5 is a block diagram illustrating a pitch-roll bending module in accordance with one example embodiment. The pitch-roll bending module 402 includes a stereo frame access module 502, a feature projection module 504, a feature alignment module 506, and a pitch-roll bias estimation module 508.

The stereo frame access module 502 accesses a first image from a first camera (e.g., left side) of the optical sensors 212 and a second image from a second camera (e.g., right side) of the optical sensors 212. In one example, the stereo frame access module 502 determines stereo VIO features of a first stereo frame.

The feature projection module 504 accesses stereo VIO data (e.g., 3D points, pose) from the VIO system 302. In one example, the feature projection module 504 projects the stereo VIO features from the optical sensors 212 to a rectified two-dimensional coordinate system.

The feature alignment module 506 determines whether corresponding stereo VIO features (from a left side image and a right side image) lie on the same raster line. For example, the feature alignment module 506 determines that a VIO feature from the left side image does not align in the same raster line with the same corresponding VIO feature from the right side image. In that case, the feature alignment module 506 triggers a compensation process at the pitch-roll bias estimation module 508.

The pitch-roll bias estimation module 508 estimates a pitch-roll bias based on the misalignment between the left side VIO feature and the right side VIO feature with respect to a raster line of one of the right side or left side image. The pitch-roll bias estimation module 508 computes the pitch-roll bias based on a misalignment in the projected stereo VIO features in the two-dimensional coordinate system. The pitch-roll bias estimation module 508 provides the estimated pitch-roll bias to the mitigation module 406 for rectification.

Figure 6:
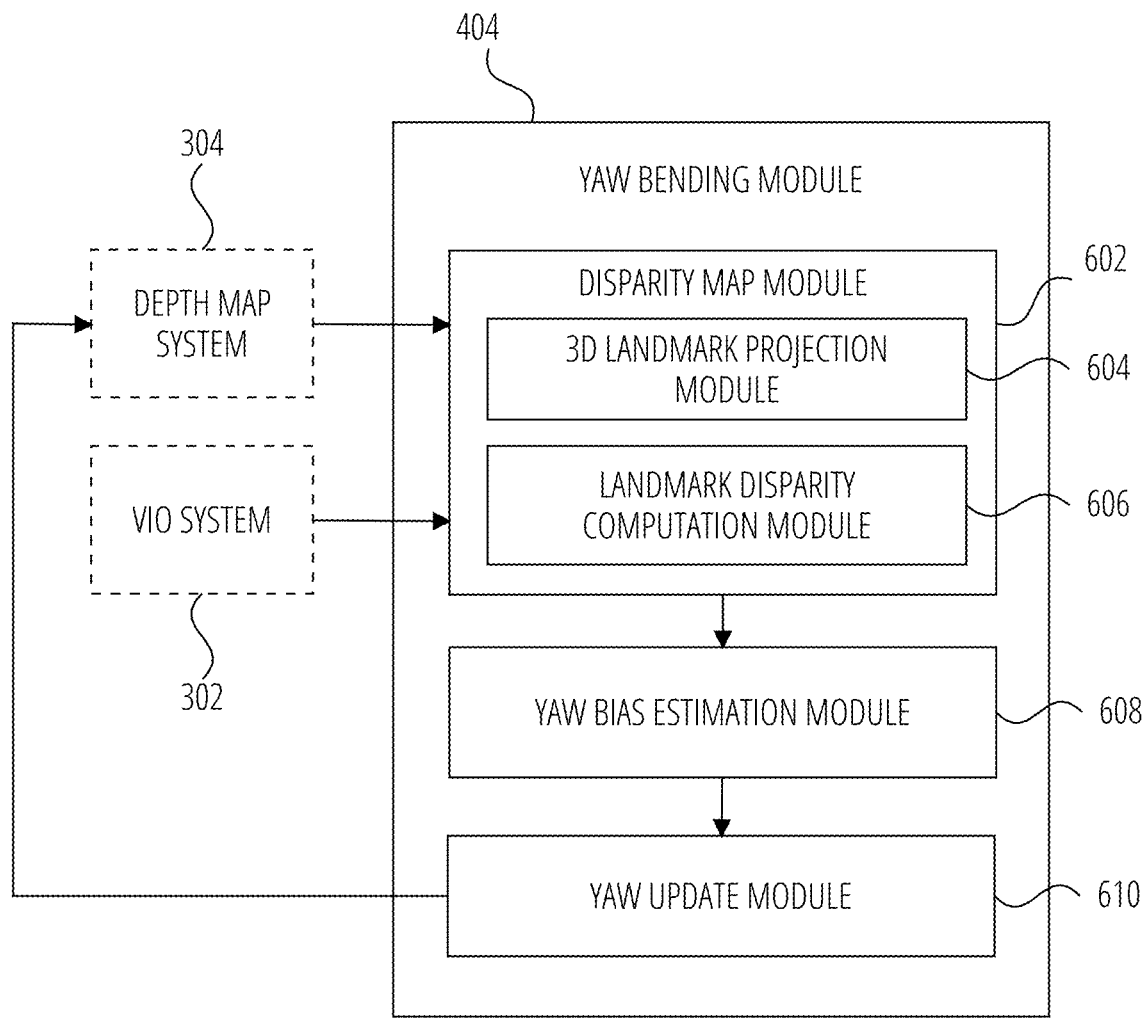
FIG. 6 is a block diagram illustrating a yaw bending module in accordance with one example embodiment.

FIG. 6 is a block diagram illustrating the yaw bending module 404 in accordance with one example embodiment. The yaw bending module 404 includes a disparity map module 602, a yaw bias estimation module 608, and a yaw update module 610.

The disparity map module 602 accesses VIO data from the VIO system 302 and depth data from the depth map system 304. The disparity map module 602 identifies a disparity or misalignment (for a feature point) between the VIO data and the depth data. In one example embodiment, the disparity map module 602 includes a 3D landmark projection module 604 and a landmark disparity computation module 606.

The 3D landmark projection module 604 projects the 3D feature points from the VIO data onto a two-dimensional coordinate system (e.g., depth data for each feature point). For example, the 3D landmark projection module 604 identifies three-dimensional landmarks of the first stereo frame using the VIO data from the VIO system 302. The 3D landmark projection module 604 projects the three-dimensional landmarks on a two-dimensional disparity map. The two-dimensional disparity map indicates two-dimensional locations and corresponding depth values of landmarks.

The landmark disparity computation module 606 determines a depth misalignment, for each feature point or landmark, between a stereo depth from the depth data and a VIO depth from the VIO data. In one example, the landmark disparity computation module 606 computes a depth bias value for each landmark in the first stereo frame.

The yaw bias estimation module 608 estimates a yaw bias based on the depth misalignment of the feature points. In one example, the yaw bias estimation module 608 computes a yaw bias value based on the depth bias value for each landmark.

The yaw update module 610 rectifies the yaw bias based on the depth misalignment and provides an updated configuration setting to the depth map system 304. The updated configuration setting includes the yaw bias estimate. In one example, the yaw update module 610 updates a rectification map based on the total yaw bending estimate and requests the depth map system 304 to compute a depth map based on the rectification map.

The following pseudo code illustrates an example implementation of the operations of the disparity map module 602:

| 1. | Call [FeatureCount, RotationMean, RotationVariance] = EstimateYawRotationBias( ) |
|---|---|
| 2. | if FeatureCount is larger than a threshold |
| 3. | Call UpdateYaw(RotationMean, RotationVariance) |

The following pseudo code illustrates an example implementation of the operations of the yaw bias estimation module 608:

```
Yaw estimation procedure EstimateYawRotationBias( ):
Let featureCount =0
Let rotationMean =0
Let rotationMeanSquared =0
for each feature from VIO:
if feature is not valid continue to next feature
# Match it against the existing disparity map
[X,Y]=projectFeatureToDepthSystemCoordinates( )
Assign sampledDisparityVal = sample disparity at X,Y
# Convert depth from VIO to equivalent disparity
Let f be the focal length of the camera
Let B be the baseline between the two cameras
Let vioDepth be the depth value of the VIO feature
assign vioDisparity=f*B/vioDepth
# Compute equivalent rotation (implemented by the equations above)
Assign EquivalentRotation = ComputeEquivalentRotation(X,
d1=sampledDisparityVal ,d2=vioDisparity)
if abs(EquivalentRotation) is smaller a threshold
Assign featureCount =featureCount+1
Assign rotationMean =rotationMea+ EquivalentRotation
Assign rotationMeanSquared =
rotationMeanSquared+EquivalentRotation*EquivalentRotation
Assign rotationMean =rotationMean /featureCount
Assign rotationMeanSquared rotationMeanSquared /featureCount
Assign RotationVariance = rotationMeanSquared − rotationMean *
rotationMean;
return [featureCount, rotationMean, RotationVariance]
```

The following pseudo code illustrates an example implementation of the operations of the yaw update module 610:

```
Yaw update procedure UpdateYaw( ):
1.   Assign FilteredYawBias=Filter(RotationMean,RotationVariance)
2.   if FilteredYawBias is larger than a threshold
3.   update the total yaw bending estimation
```

Figure 7:
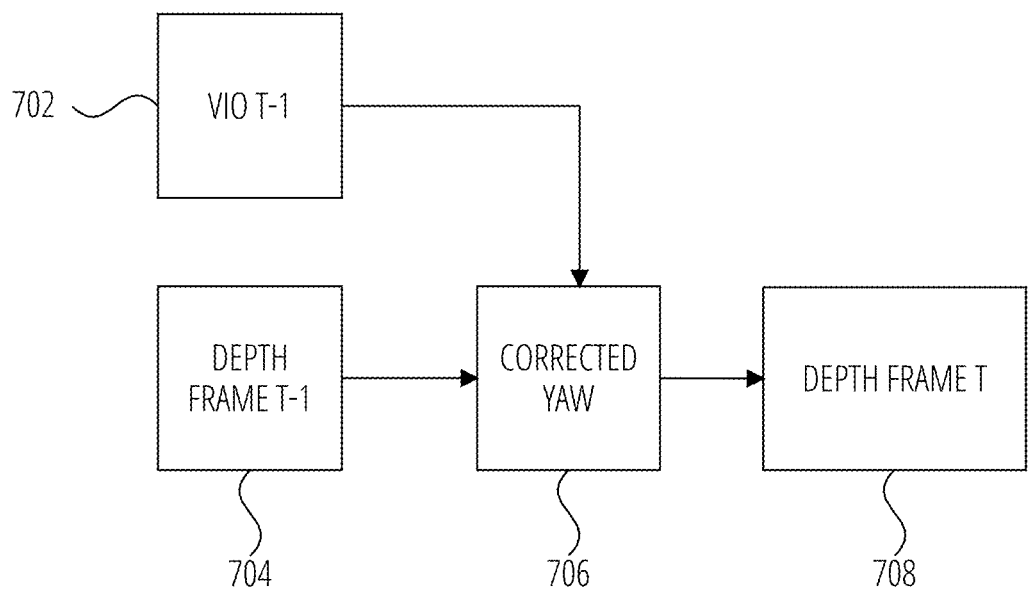
FIG. 7 is a block diagram illustrating a corrected depth frame in accordance with one embodiment.

FIG. 7 is a block diagram illustrating a corrected depth frame in accordance with one embodiment. A VIO t−1 702 illustrates VIO data from VIO system 302 for a frame taken at time t−1. A depth frame t−1 704 illustrates stereo depth data of the same frame taken at the time t−1. The bending correction module 216 determines a corrected yaw 706 based on estimated yaw bias (based a comparison of depth data for feature points from the VIO data and the stereo depth data. The depth map system 304 receives the updated configuration setting that includes the estimated yaw bias and rectifies its yaw bias. The depth map system 304 generates a depth frame at time t (depth frame t 708) based on the rectified yaw bias.

Figure 8:
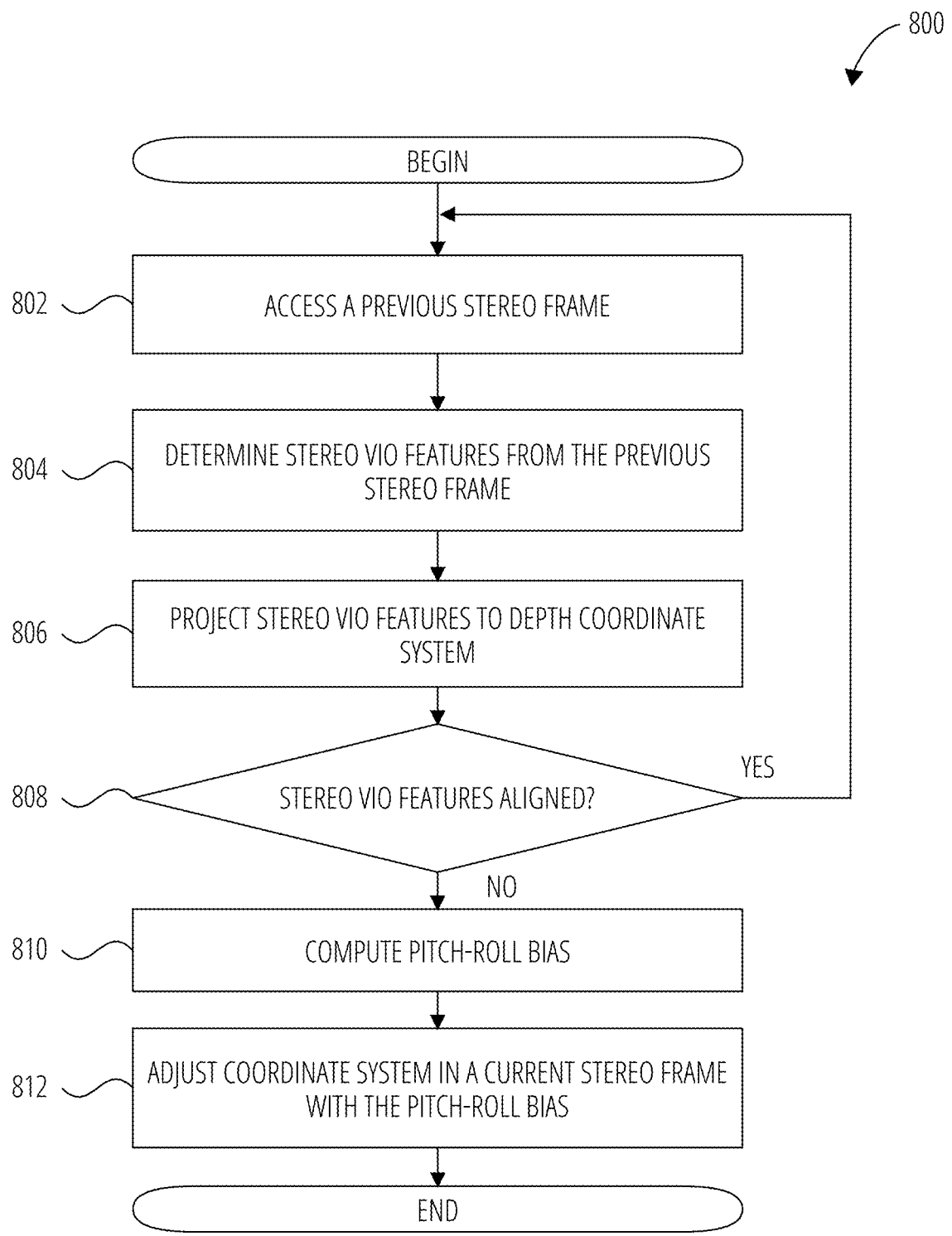
FIG. 8 is a flow diagram illustrating a method for adjusting a coordinate system in accordance with one example embodiment.

FIG. 8 is a flow diagram illustrating a method 800 for adjusting stereo VIO features in accordance with one example embodiment. Operations in the method 800 may be performed by the bending correction module 216, using components (e.g., modules, engines) described above with respect to FIG. 4. Accordingly, the method 800 is described by way of example with reference to the pitch-roll bending module 402. However, it shall be appreciated that at least some of the operations of the method 800 may be deployed on various other hardware configurations or be performed by similar components residing elsewhere.

In block 802, the pitch-roll bending module 402 accesses a previous stereo frame. In block 804, the pitch-roll bending module 402 determines stereo VIO features from the previous stereo frame. In block 806, the pitch-roll bending module 402 projects stereo VIO features to the depth coordinate system. In decision block 808, the pitch-roll bending module 402 determines whether the stereo VIO features are aligned. In block 810, the pitch-roll bending module 402 computes pitch-roll bias. In block 812, the pitch-roll bending module 402 adjusts the depth coordinate system in a current stereo frame with the pitch-roll bias.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 9:
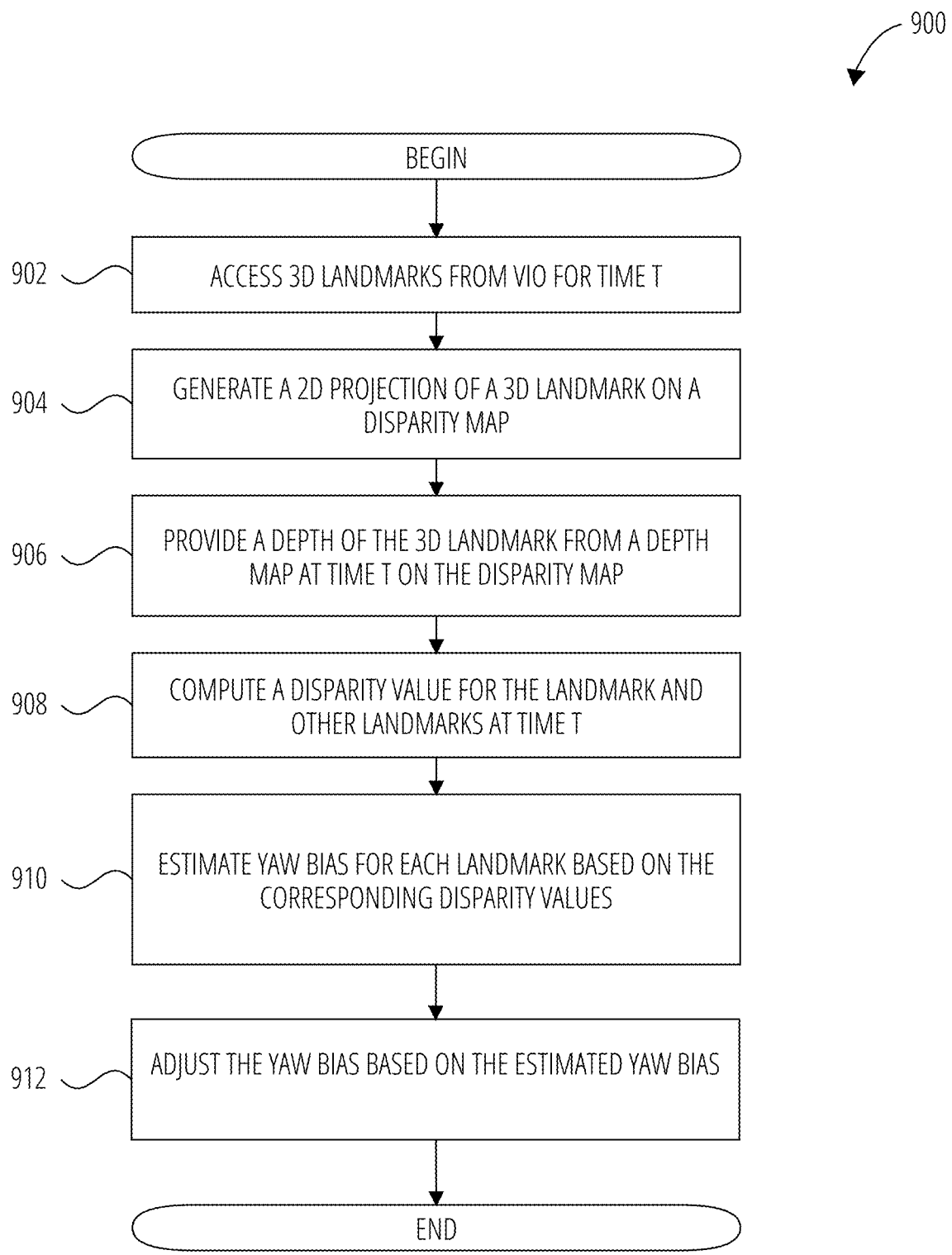
FIG. 9 is a flow diagram illustrating a method for adjusting a yaw bias in accordance with one example embodiment.

FIG. 9 is a flow diagram illustrating a method 900 for adjusting a yaw bias in accordance with one example embodiment. Operations in the method 900 may be performed by the bending correction module 216, using components (e.g., modules, engines) described above with respect to FIG. 4. Accordingly, the method 900 is described by way of example with reference to the yaw bending module 404. However, it shall be appreciated that at least some of the operations of the method 900 may be deployed on various other hardware configurations or be performed by similar components residing elsewhere.

In block 902, the yaw bending module 404 accesses 3D landmarks from VIO for time t. In block 904, the yaw bending module 404 generates a 2D projection of a 3D landmark on a 2D disparity map. In block 906, the yaw bending module 404 provides a depth of the 3D landmark from a depth map at time t on the disparity map. In block 908, the yaw bending module 404 computes a disparity value for the landmark and other landmarks at time t. In block 910, the yaw bending module 404 estimates yaw bias for each landmark based on the corresponding disparity values. In block 912, the yaw bending module 404 adjusts the yaw bias based on the estimated yaw bias.

Figure 10:
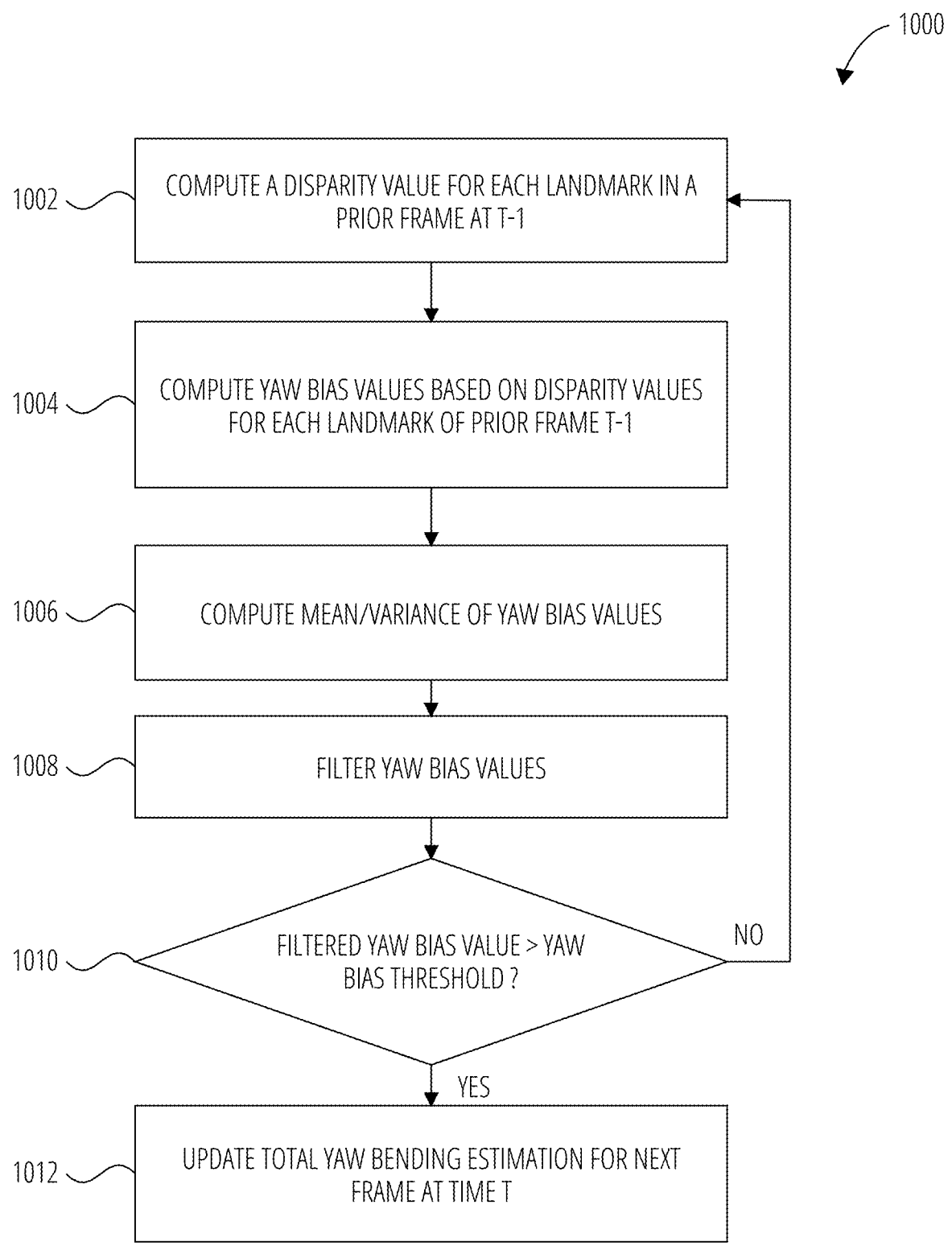
FIG. 10 is a flow diagram illustrating a method for updating the total yaw bending estimation in accordance with one example embodiment.

FIG. 10 is a flow diagram illustrating a method 1000 for updating the total yaw bending estimation in accordance with one example embodiment. Operations in the method 1000 may be performed by the bending correction module 216, using components (e.g., modules, engines) described above with respect to FIG. 2. Accordingly, the method 1000 is described by way of example with reference to the bending correction module 216. However, it shall be appreciated that at least some of the operations of the method 1000 may be deployed on various other hardware configurations or be performed by similar components residing elsewhere.

In block 1002, the yaw bending module 404 computes a disparity value for each landmark in a prior frame at t−1. In block 1004, the yaw bending module 404 computes yaw bias values based on disparity values for each landmark of prior frame t−1. In block 1006, the yaw bending module 404 computes mean/variance of yaw bias values. In block 1008, the yaw bending module 404 filters yaw bias values. In decision block 1010, the yaw bending module 404 determines whether the filtered yaw bias value exceeds a yaw bias threshold. In block 1012, the yaw bending module 404 updates total yaw bending estimation for next frame at time t.

Figure 11:
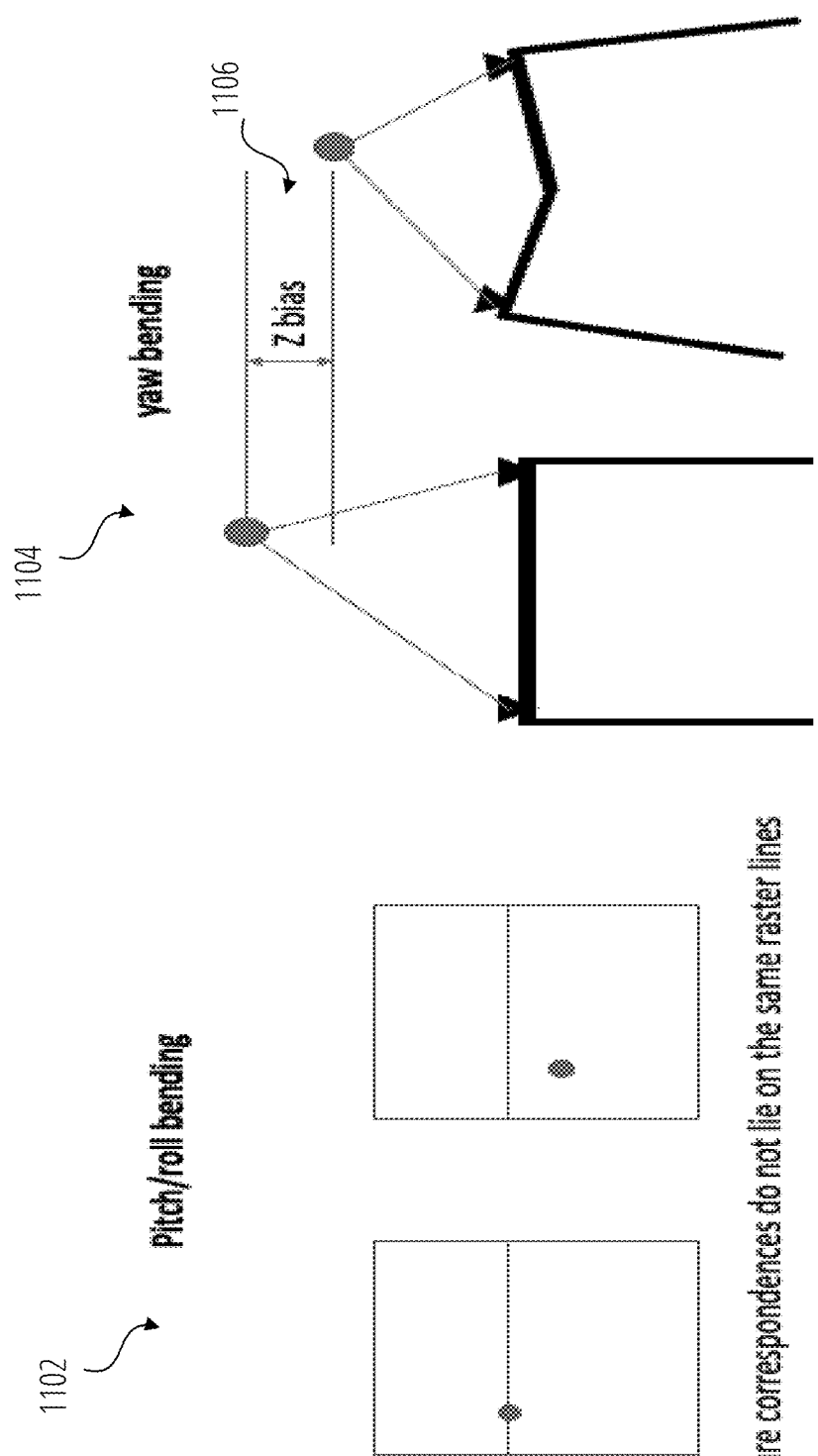
FIG. 11 illustrates misalignment errors resulting from bending of a flexible device in accordance with one embodiment.

FIG. 11 illustrates misalignment errors resulting from bending of a flexible device. Example 1102 illustrates feature correspondences that do not lie on the same raster lines due to pitch/roll bending. Example 1104 illustrates z bias 1106 due to yaw bending.

Figure 12:
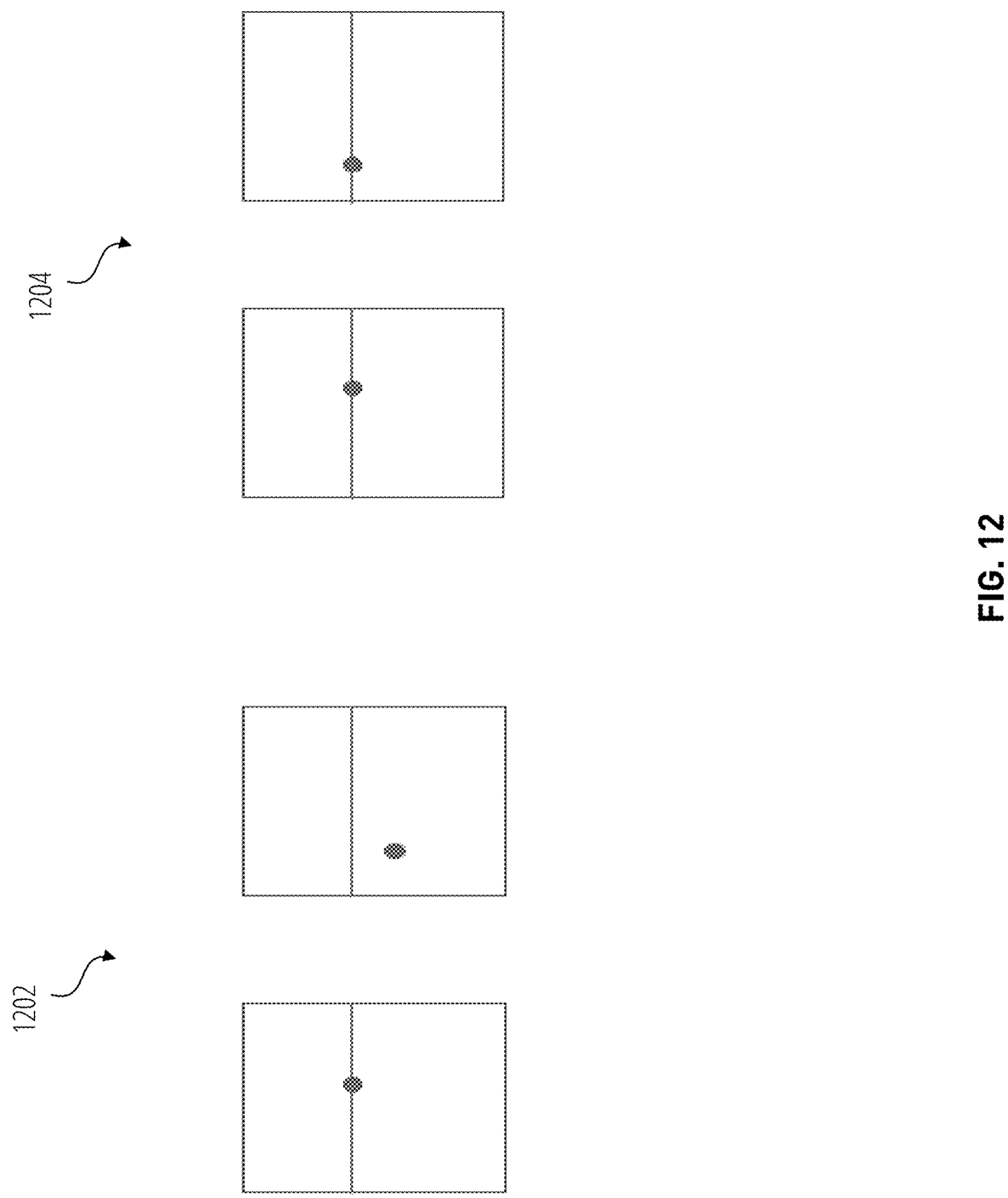
FIG. 12 illustrates a pitch-roll misalignment in accordance with one embodiment.

FIG. 12 illustrates a pitch-roll misalignment in accordance with one embodiment. Example 1202 illustrates corresponding features (between a left side and a right side) that do not lie on the same raster line due to bending. Example 1204 illustrates corresponding features that lie on the same raster line.

Figure 13:
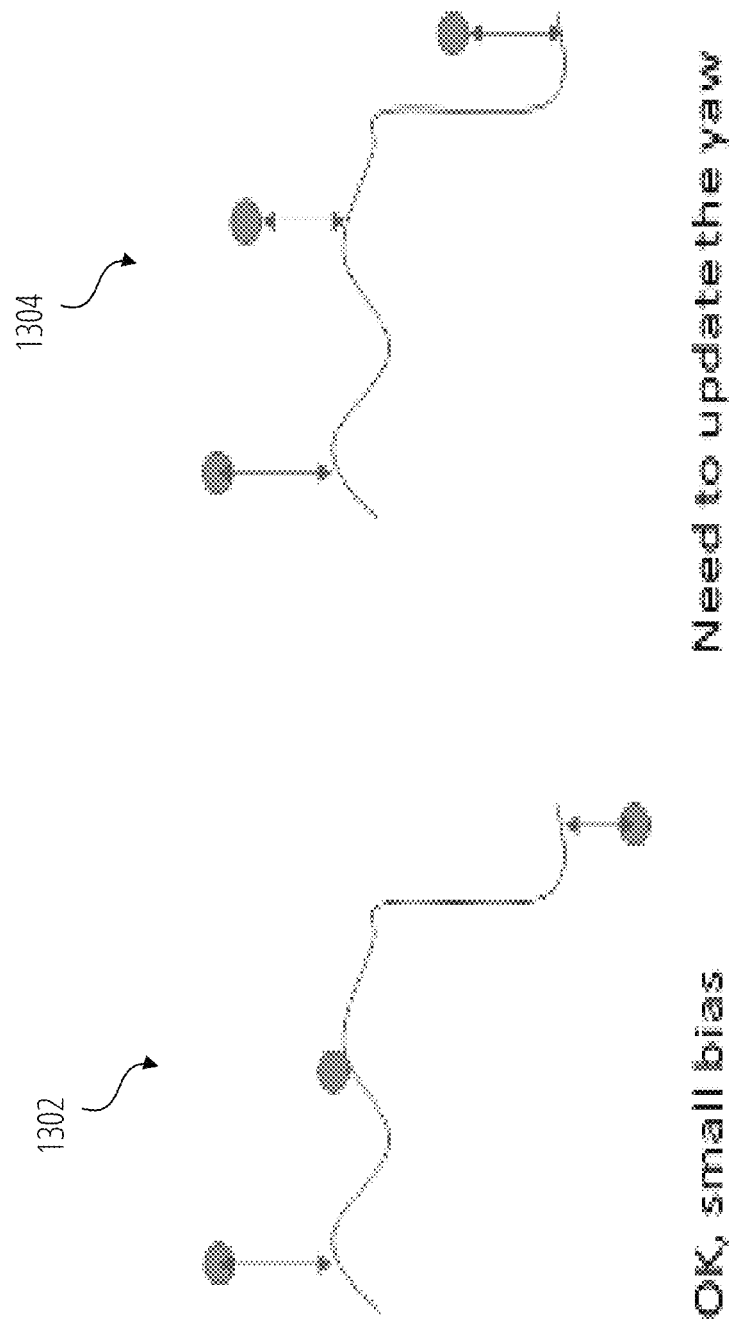
FIG. 13 illustrates depth misalignment on a projected two-dimensional map in accordance with one embodiment.

FIG. 13 illustrates depth misalignment on a projected two-dimensional map in accordance with one embodiment. Example 1302 illustrates a disparity map over time. Example 1302 indicates that the disparity (of each feature correspondence) is relatively small (within a threshold) over time. Example 1304 indicates that the disparity remains outside the yaw threshold over time and that the yaw bias is to be updated.

System with Head-Wearable Apparatus

Figure 14:
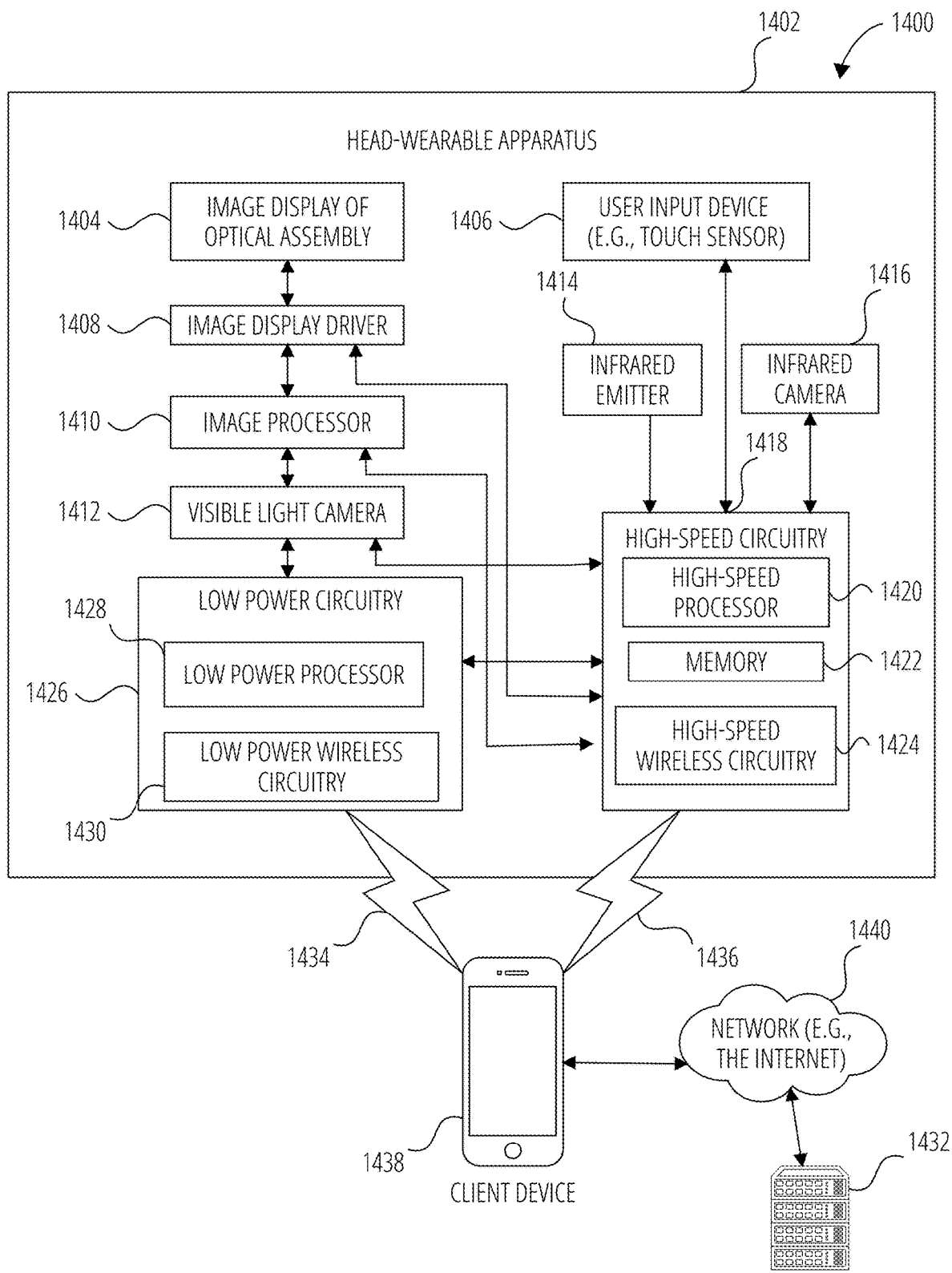
FIG. 14 illustrates a network environment in which a head-wearable device can be implemented according to one example embodiment.

FIG. 14 illustrates a network environment 1400 in which the head-wearable apparatus 1402 can be implemented according to one example embodiment. FIG. 14 is a high-level functional block diagram of an example head-wearable apparatus 1402 communicatively coupled a mobile client device 1438 and a server system 1432 via various network 1440.

head-wearable apparatus 1402 includes a camera, such as at least one of visible light camera 1412, infrared emitter 1414 and infrared camera 1416. The client device 1438 can be capable of connecting with head-wearable apparatus 1402 using both a communication 1434 and a communication 1436. client device 1438 is connected to server system 1432 and network 1440. The network 1440 may include any combination of wired and wireless connections.

The head-wearable apparatus 1402 further includes two image displays of the image display of optical assembly 1404. The two include one associated with the left lateral side and one associated with the right lateral side of the head-wearable apparatus 1402. The head-wearable apparatus 1402 also includes image display driver 1408, image processor 1410, low-power low power circuitry 1426, and high-speed circuitry 1418. The image display of optical assembly 1404 are for presenting images and videos, including an image that can include a graphical user interface to a user of the head-wearable apparatus 1402.

The image display driver 1408 commands and controls the image display of the image display of optical assembly 1404. The image display driver 1408 may deliver image data directly to the image display of the image display of optical assembly 1404 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1402 includes a frame and stems (or temples) extending from a lateral side of the frame. The head-wearable apparatus 1402 further includes a user input device 1406 (e.g., touch sensor or push button) including an input surface on the head-wearable apparatus 1402. The user input device 1406 (e.g., touch sensor or push button) is to receive from the user an input selection to manipulate the graphical user interface of the presented image.

The components shown in FIG. 14 for the head-wearable apparatus 1402 are located on one or more circuit boards, for example a PCB or flexible PCB, in the rims or temples. Alternatively, or additionally, the depicted components can be located in the chunks, frames, hinges, or bridge of the head-wearable apparatus 1402. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1402 includes a memory 1422 which stores instructions to perform a subset or all of the functions described herein. memory 1422 can also include storage device.

As shown in FIG. 14, high-speed circuitry 1418 includes high-speed processor 1420, memory 1422, and high-speed wireless circuitry 1424. In the example, the image display driver 1408 is coupled to the high-speed circuitry 1418 and operated by the high-speed processor 1420 in order to drive the left and right image displays of the image display of optical assembly 1404. high-speed processor 1420 may be any processor capable of managing high-speed communications and operation of any general computing system needed for head-wearable apparatus 1402. The high-speed processor 1420 includes processing resources needed for managing high-speed data transfers on communication 1436 to a wireless local area network (WLAN) using high-speed wireless circuitry 1424. In certain examples, the high-speed processor 1420 executes an operating system such as a LINUX operating system or other such operating system of the head-wearable apparatus 1402 and the operating system is stored in memory 1422 for execution. In addition to any other responsibilities, the high-speed processor 1420 executing a software architecture for the head-wearable apparatus 1402 is used to manage data transfers with high-speed wireless circuitry 1424. In certain examples, high-speed wireless circuitry 1424 is configured to implement Institute of Electrical and Electronic Engineers (IEEE) 802.11 communication standards, also referred to herein as Wi-Fi. In other examples, other high-speed communications standards may be implemented by high-speed wireless circuitry 1424.

The low power wireless circuitry 1430 and the high-speed wireless circuitry 1424 of the head-wearable apparatus 1402 can include short range transceivers (Bluetooth™) and wireless wide, local, or wide area network transceivers (e.g., cellular or WiFi). The client device 1438, including the transceivers communicating via the communication 1434 and communication 1436, may be implemented using details of the architecture of the head-wearable apparatus 1402, as can other elements of network 1440.

The memory 1422 includes any storage device capable of storing various data and applications, including, among other things, camera data generated by the left and right, infrared camera 1416, and the image processor 1410, as well as images generated for display by the image display driver 1408 on the image displays of the image display of optical assembly 1404. While memory 1422 is shown as integrated with high-speed circuitry 1418, in other examples, memory 1422 may be an independent standalone element of the head-wearable apparatus 1402. In certain such examples, electrical routing lines may provide a connection through a chip that includes the high-speed processor 1420 from the image processor 1410 or low power processor 1428 to the memory 1422. In other examples, the high-speed processor 1420 may manage addressing of memory 1422 such that the low power processor 1428 will boot the high-speed processor 1420 any time that a read or write operation involving memory 1422 is needed.

As shown in FIG. 14, the low power processor 1428 or high-speed processor 1420 of the head-wearable apparatus 1402 can be coupled to the camera (visible light camera 1412; infrared emitter 1414, or infrared camera 1416), the image display driver 1408, the user input device 1406 (e.g., touch sensor or push button), and the memory 1422.

The head-wearable apparatus 1402 is connected with a host computer. For example, the head-wearable apparatus 1402 is paired with the client device 1438 via the communication 1436 or connected to the server system 1432 via the network 1440. server system 1432 may be one or more computing devices as part of a service or network computing system, for example, that include a processor, a memory, and network communication interface to communicate over the network 1440 with the client device 1438 and head-wearable apparatus 1402.

The client device 1438 includes a processor and a network communication interface coupled to the processor. The network communication interface allows for communication over the network 1440, communication 1434 or communication 1436. client device 1438 can further store at least portions of the instructions for generating a binaural audio content in the client device 1438's memory to implement the functionality described herein.

Output components of the head-wearable apparatus 1402 include visual components, such as a display such as a liquid crystal display (LCD), a plasma display panel (PDP), a light emitting diode (LED) display, a projector, or a waveguide. The image displays of the optical assembly are driven by the image display driver 1408. The output components of the head-wearable apparatus 1402 further include acoustic components (e.g., speakers), haptic components (e.g., a vibratory motor), other signal generators, and so forth. The input components of the head-wearable apparatus 1402, the client device 1438, and server system 1432, such as the user input device 1406, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1402 may optionally include additional peripheral device elements. Such peripheral device elements may include biometric sensors, additional sensors, or display elements integrated with head-wearable apparatus 1402. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1436 from the client device 1438 via the low power wireless circuitry 1430 or high-speed wireless circuitry 1424.

Figure 15:
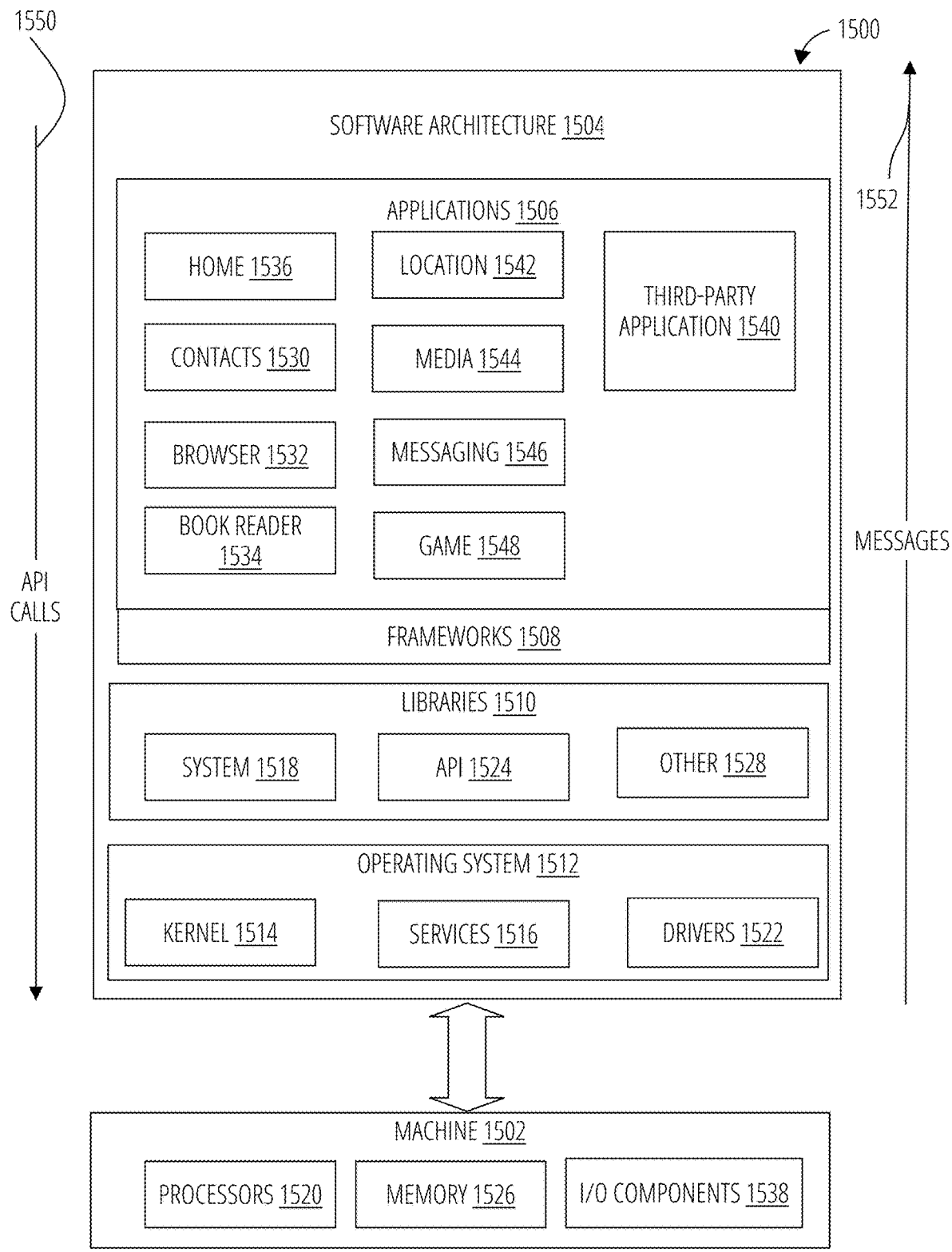
FIG. 15 is block diagram showing a software architecture within which the present disclosure may be implemented, according to an example embodiment.

FIG. 15 is a block diagram 1500 illustrating a software architecture 1504, which can be installed on any one or more of the devices described herein. The software architecture 1504 is supported by hardware such as a machine 1502 that includes Processors 1520, memory 1526, and I/O Components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, Processor management (e.g., scheduling), Component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D)

and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
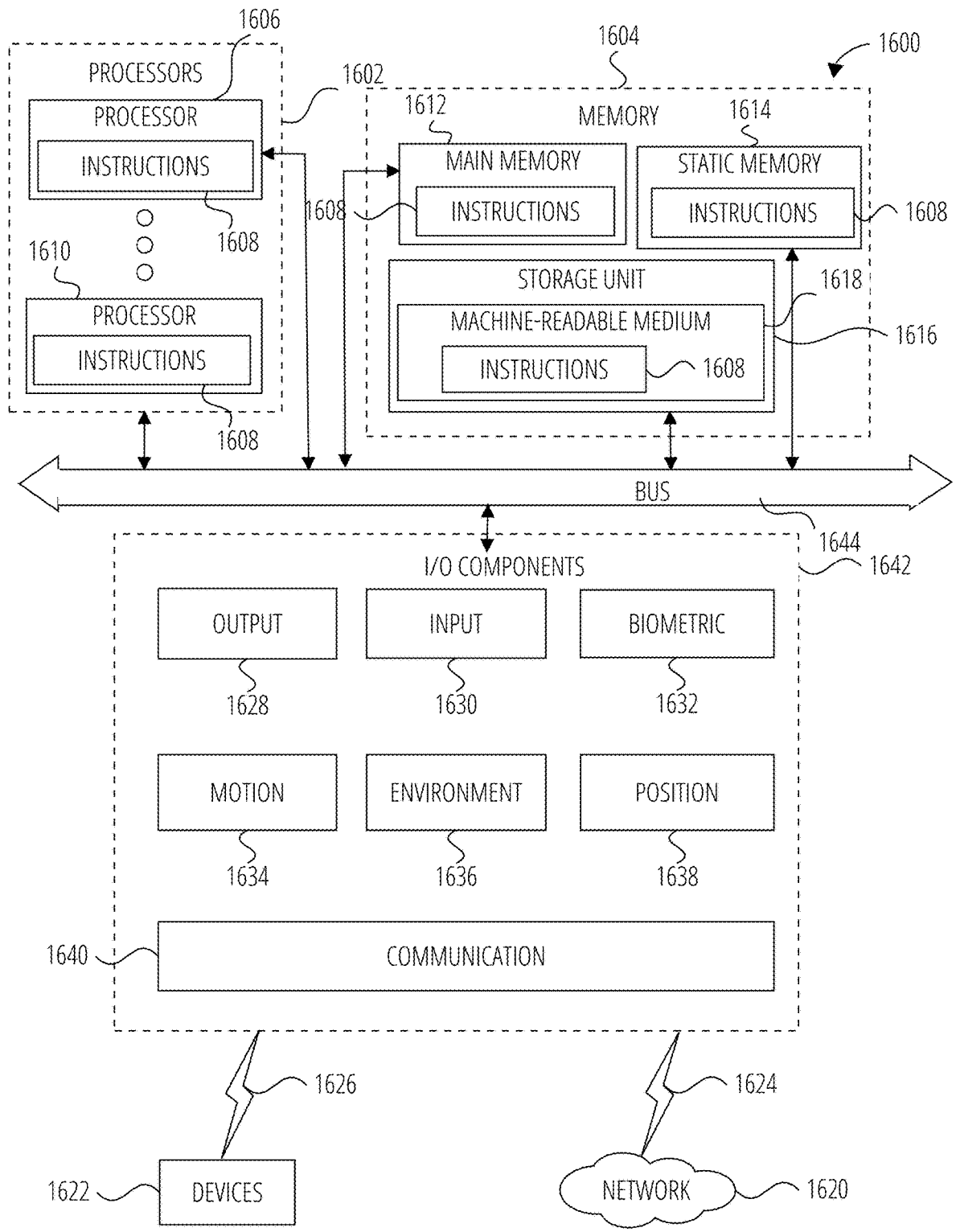
FIG. 16 is a diagrammatic representation of a machine in the form of a computer system within which a set of instructions may be executed for causing the machine to perform any one or more of the methodologies discussed herein, according to one example embodiment.

FIG. 16 is a diagrammatic representation of the machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include Processors 1602, memory 1604, and I/O Components 1642, which may be configured to communicate with each other via a bus 1644. In an example embodiment, the Processors 1602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1606 and a Processor 1610 that execute the instructions 1608. The term "Processor" is intended to include multi-core Processors that may comprise two or more independent Processors (sometimes referred to as "cores") that may execute instructions contemporaneously. Although FIG. 16 shows multiple Processors 1602, the machine 1600 may include a single Processor with a single core, a single Processor with multiple cores (e.g., a multi-core Processor), multiple Processors with a single core, multiple Processors with multiples cores, or any combination thereof.

The memory 1604 includes a main memory 1612, a static memory 1614, and a storage unit 1616, both accessible to the Processors 1602 via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the Processors 1602 (e.g., within the Processor's cache memory), or any suitable combination thereof, during execution thereof by the machine 1600.

The I/O Components 1642 may include a wide variety of Components to receive input, provide output, produce output, transmit information, exchange information, capture measurements, and so on. The specific I/O Components 1642 that are included in a particular machine will depend on the type of machine. For example, portable machines such as mobile phones may include a touch input device or other such input mechanisms, while a headless server machine will likely not include such a touch input device. It will be appreciated that the I/O Components 1642 may include many other Components that are not shown in FIG. 16. In various example embodiments, the I/O Components 1642 may include output Components 1628 and input Components 1630. The output Components 1628 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1630 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1642 may include biometric Components 1632, motion Components 1634, environmental Components 1636, or position Components 1638, among a wide array of other Components. For example, the biometric Components 1632 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1634 include acceleration sensor Components (e.g., accelerometer), gravitation sensor Components, rotation sensor Components (e.g., gyroscope), and so forth. The environmental Components 1636 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1638 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1642 further include communication Components 1640 operable to couple the machine 1600 to a network 1620 or devices 1622 via a coupling 1624 and a coupling 1626, respectively. For example, the communication Components 1640 may include a network interface Component or another suitable device to interface with the network 1620. In further examples, the communication Components 1640 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1622 may be another machine or any of a wide variety of peripheral devices (e.g., a peripheral device coupled via a USB).

Moreover, the communication Components 1640 may detect identifiers or include Components operable to detect identifiers. For example, the communication Components 1640 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1640, such as location via Internet Protocol (IP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the Processors 1602) and/or storage unit 1616 may store one or more sets of instructions and data structures (e.g., software) embodying or used by any one or more of the methodologies or functions described herein. These instructions (e.g., the instructions 1608), when executed by Processors 1602, cause various operations to implement the disclosed embodiments.

The instructions 1608 may be transmitted or received over the network 1620, using a transmission medium, via a network interface device (e.g., a network interface Component included in the communication Components 1640) and using any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method for correcting a bending of a flexible device comprising: accessing feature data of a first stereo frame that is generated by stereo optical sensors of the flexible device, the feature data generated based on a visual-inertial odometry (VIO) system of the flexible device; accessing depth map data of the first stereo frame, the depth map data generated based on a depth map system of the flexible device; estimating a pitch-roll bias and a yaw bias based on the features data and the depth map data of the first stereo frame; and generating a second stereo frame after the first stereo frame, the second stereo frame based on the pitch-roll bias and the yaw bias of the first stereo frame.

Example 2 includes example 1, wherein estimating the pitch-roll bias further comprises: determining stereo VIO features of the first stereo frame; projecting the stereo VIO features to a two-dimensional coordinate system; determining that the projected stereo VIO features are not aligned in the two-dimensional coordinate system; and in response to determining that the projected stereo VIO features are not aligned in the two-dimensional coordinate system, computing the pitch-roll bias based on a misalignment in the projected stereo VIO features in the two-dimensional coordinate system.

Example 3 includes example 2, wherein determining that the projected stereo VIO features are not aligned in the two-dimensional coordinate system further comprise: identifying a first feature in a left frame of the first stereo frame; identifying a second feature in a right frame of the first stereo frame, the second feature corresponding to the first feature; and determining that the first feature and the second feature lie on different raster lines of the two-dimensional coordinate system.

Example 4 includes example 2, wherein generating the second stereo frame further comprises: identifying a first feature in a left frame of the second stereo frame; identifying a second feature in a right frame of the second stereo frame, the second feature corresponding to the first feature; and rectifying a location of the first feature in the left frame or the second feature in the right frame based on the pitch-roll bias of the first stereo frame.

Example 5 includes example 1, wherein estimating the yaw bias further comprises: identifying three-dimensional landmarks of the first stereo frame using the VIO system; projecting the three-dimensional landmarks on a two-dimensional disparity map, the two-dimensional disparity map indicating two-dimensional locations and corresponding depth values of landmarks; computing a depth bias value for each landmark in the first stereo frame; and computing a yaw bias value based on the depth bias value for each landmark.

Example 6 includes example 5, wherein projecting the three-dimensional landmarks further comprises: depicting a first landmark of the first stereo frame using the VIO system at a first depth value on the two-dimensional disparity map; and depicting the first landmark of the first stereo frame using the depth map data at a second depth value on the two-dimensional disparity map, wherein the depth bias value of the first landmark is a difference between the first depth value and the second depth value.

Example 7 includes example 5, further comprising: computing statistics of the yaw bias values of a plurality of landmarks in the first stereo frame; computing a filtered yaw bias value based on the statistics of the yaw bias values; determining that the filtered yaw bias value exceeds a yaw bias threshold; in response to determining that the filtered yaw bias value exceeds the yaw bias threshold, updating a total yaw bending estimate for the second stereo frame; updating a rectification map based on the total yaw bending estimate; and computing a depth map based on the rectification map.

Example 8 includes example 1, wherein the VIO system is configured to identify a pose of the flexible device based on sensor data from inertial sensors and optical sensors of the flexible device.

Example 9 includes example 1, wherein the depth map system determines a depth of a pixel in the first stereo frame based on a triangulation of the pixel depicted in a right side of the first stereo frame and in a left side of the first stereo frame.

Example 10 includes example 1, further comprising: generating virtual content in the first stereo frame; and adjusting a display of the virtual content in the second stereo frame based on the pitch-roll bias and yaw bias of the first stereo frame.

Example 11 is computing apparatus comprising: a processor; and a memory storing instructions that, when executed by the processor, configure the apparatus to: access feature data of a first stereo frame that is generated by stereo optical sensors of a flexible device, the feature data generated based on a visual-inertial odometry (VIO) system of the flexible device, access depth map data of the first stereo frame, the depth map data generated based on a depth map system of the flexible device; estimate a pitch-roll bias and a yaw bias based on the features data and the depth map data of the first stereo frame; and generate a second stereo frame after the first stereo frame, the second stereo frame based on the pitch-roll bias and the yaw bias of the first stereo frame.

Example 12 includes example 11, wherein estimating the pitch-roll bias further comprises: determine stereo VIO features of the first stereo frame; project the stereo VIO features to a two-dimensional coordinate system; determine that the projected stereo VIO features are not aligned in the two-dimensional coordinate system; and in response to determining that the projected stereo VIO features are not aligned in the two-dimensional coordinate system, compute the pitch-roll bias based on a misalignment in the projected stereo VIO features in the two-dimensional coordinate system.

Example 13 includes example 12, wherein determining that the projected stereo VIO features are not aligned in the two-dimensional coordinate system further comprise: identify a first feature in a left frame of the first stereo frame; identify a second feature in a right frame of the first stereo frame, the second feature corresponding to the first feature; and determine that the first feature and the second feature lie on different raster lines of the two-dimensional coordinate system.

Example 14 includes example 12, wherein generating the second stereo frame further comprises: identify a first feature in a left frame of the second stereo frame; identify a second feature in a right frame of the second stereo frame, the second feature corresponding to the first feature; and rectify a location of the first feature in the left frame or the second feature in the right frame based on the pitch-roll bias of the first stereo frame.

Example 15 includes example 11, wherein estimating the yaw bias further comprises: identify three-dimensional landmarks of the first stereo frame using the VIO system; project the three-dimensional landmarks on a two-dimensional disparity map, the two-dimensional disparity map indicating two-dimensional locations and corresponding depth values of landmarks; compute a depth bias value for each landmark in the first stereo frame; and compute a yaw bias value based on the depth bias value for each landmark.

Example 16 includes example 15, wherein projecting the three-dimensional landmarks further comprises: depict a first landmark of the first stereo frame using the VIO system at a first depth value on the two-dimensional disparity map; and depict the first landmark of the first stereo frame using the depth map data at a second depth value on the two-dimensional disparity map, wherein the depth bias value of the first landmark is a difference between the first depth value and the second depth value.

Example 17 includes example 15, wherein the instructions further configure the apparatus to: compute statistics of the yaw bias values of a plurality of landmarks in the first stereo frame; compute a filtered yaw bias value based on the statistics of the yaw bias values; determine that the filtered yaw bias value exceeds a yaw bias threshold; in response to determining that the filtered yaw bias value exceeds the yaw bias threshold, update a total yaw bending estimate for the second stereo frame; update a rectification map based on the total yaw bending estimate; and compute a depth map based on the rectification map.

Example 18 includes example 11, wherein the VIO system is configured to identify a pose of the flexible device based on sensor data from inertial sensors and optical sensors of the flexible device.

Example 19 includes example 11, wherein the depth map system determines a depth of a pixel in the first stereo frame based on a triangulation of the pixel depicted in a right side of the first stereo frame and in a left side of the first stereo frame.

Example 20 is a non-transitory computer-readable storage medium, the computer-readable storage medium including instructions that when executed by a computer, cause the computer to: access feature data of a first stereo frame that is generated by stereo optical sensors of the flexible device, the feature data generated based on a visual-inertial odometry (VIO) system of the flexible device, access depth map data of the first stereo frame, the depth map data generated based on a depth map system of the flexible device; estimate a pitch-roll bias and a yaw bias based on the features data and the depth map data of the first stereo frame; and generate a second stereo frame after the first stereo frame, the second stereo frame based on the pitch-roll bias and the yaw bias of the first stereo frame.

What is claimed is:

1. A method for correcting a bending of a flexible device comprising:
   accessing feature data of a first stereo frame that is generated by stereo optical sensors of the flexible device, the feature data generated based on a visual-inertial odometry (VIO) system of the flexible device;
   accessing depth map data of the first stereo frame, the depth map data generated based on a depth map system of the flexible device;
   estimating a pitch-roll bias based on the feature data and the depth map data of the first stereo frame by: projecting stereo VIO features of the first stereo frame to a two-dimensional coordinate system, and computing the pitch-roll bias based on a misalignment in the projected stereo VIO features in the two-dimensional coordinate system; and
   generating a second stereo frame after the first stereo frame, the second stereo frame based on the pitch-roll bias of the first stereo frame.

2. The method of claim 1, wherein estimating the pitch-roll bias further comprises:
   determining the stereo VIO features of the first stereo frame; and
   determining that the projected stereo VIO features are not aligned in the two-dimensional coordinate system.

3. The method of claim 2, wherein determining that the projected stereo VIO features are not aligned in the two-dimensional coordinate system further comprise:
   identifying a first feature in a left frame of the first stereo frame;
   identifying a second feature in a right frame of the first stereo frame, the second feature corresponding to the first feature; and
   determining that the first feature and the second feature lie on different raster lines of the two-dimensional coordinate system.

4. The method of claim 2, wherein generating the second stereo frame further comprises:
   identifying a first feature in a left frame of the second stereo frame;
   identifying a second feature in a right frame of the second stereo frame, the second feature corresponding to the first feature; and
   rectifying a location of the first feature in the left frame or the second feature in the right frame based on the pitch-roll bias of the first stereo frame.

5. The method of claim 1, further comprising:
   estimating a yaw bias based on the feature data and the depth map data of the first stereo frame by:
      identifying three-dimensional landmarks of the first stereo frame using the VIO system;
      projecting the three-dimensional landmarks on a two-dimensional disparity map, the two-dimensional disparity map indicating two-dimensional locations and corresponding depth values of landmarks;
      computing a depth bias value for each landmark in the first stereo frame; and
      computing a yaw bias value based on the depth bias value for each landmark.

6. The method of claim 5, wherein projecting the three-dimensional landmarks further comprises:
   depicting a first landmark of the first stereo frame using the VIO system at a first depth value on the two-dimensional disparity map; and
   depicting the first landmark of the first stereo frame using the depth map data at a second depth value on the two-dimensional disparity map,
   wherein the depth bias value of the first landmark is a difference between the first depth value and the second depth value.

7. The method of claim 5, further comprising:
   computing statistics of the yaw bias values of a plurality of landmarks in the first stereo frame;
   computing a filtered yaw bias value based on the statistics of the yaw bias values;
   determining that the filtered yaw bias value exceeds a yaw bias threshold;
   in response to determining that the filtered yaw bias value exceeds the yaw bias threshold, updating a total yaw bending estimate for the second stereo frame;
   updating a rectification map based on the total yaw bending estimate; and
   computing a depth map based on the rectification map.

8. The method of claim 1, wherein the VIO system is configured to identify a pose of the flexible device based on sensor data from inertial sensors and optical sensors of the flexible device.

9. The method of claim 1, wherein the depth map system determines a depth of a pixel in the first stereo frame based on a triangulation of the pixel depicted in a right side of the first stereo frame and in a left side of the first stereo frame.

10. The method of claim 1, further comprising:
generating virtual content in the first stereo frame; and
adjusting a display of the virtual content in the second stereo frame based on the pitch-roll bias and yaw bias of the first stereo frame.

11. A computing apparatus comprising:
one or more processors; and
a memory storing instructions that, when executed by the one or more processors, configure the apparatus to perform operations comprising:
accessing feature data of a first stereo frame that is generated by stereo optical sensors of a flexible device, the feature data generated based on a visual-inertial odometry (VIO) system of the flexible device;
accessing depth map data of the first stereo frame, the depth map data generated based on a depth map system of the flexible device;
estimating a pitch-roll bias based on the feature data and the depth map data of the first stereo frame by: projecting stereo VIO features of the first stereo frame to a two-dimensional coordinate system, and computing the pitch-roll bias based on a misalignment in the projected stereo VIO features in the two-dimensional coordinate system; and
generating a second stereo frame after the first stereo frame, the second stereo frame based on the pitch-roll bias of the first stereo frame.

12. The computing apparatus of claim 11, wherein estimating the pitch-roll bias further comprises:
determining the stereo VIO features of the first stereo frame; and
determining that the projected stereo VIO features are not aligned in the two-dimensional coordinate system.

13. The computing apparatus of claim 12, wherein determining that the projected stereo VIO features are not aligned in the two-dimensional coordinate system further comprise:
identifying a first feature in a left frame of the first stereo frame;
identifying a second feature in a right frame of the first stereo frame, the second feature corresponding to the first feature; and
determining that the first feature and the second feature lie on different raster lines of the two-dimensional coordinate system.

14. The computing apparatus of claim 12, wherein generating the second stereo frame further comprises:
identifying a first feature in a left frame of the second stereo frame;
identifying a second feature in a right frame of the second stereo frame, the second feature corresponding to the first feature; and
rectifying a location of the first feature in the left frame or the second feature in the right frame based on the pitch-roll bias of the first stereo frame.

15. The computing apparatus of claim 11, wherein the operations further comprise:
estimating a yaw bias based on the feature data and the depth map data of the first stereo frame by:
identifying three-dimensional landmarks of the first stereo frame using the VIO system;
projecting the three-dimensional landmarks on a two-dimensional disparity map, the two-dimensional disparity map indicating two-dimensional locations and corresponding depth values of landmarks;
computing a depth bias value for each landmark in the first stereo frame; and
computing a yaw bias value based on the depth bias value for each landmark.

16. The computing apparatus of claim 15, wherein projecting the three-dimensional landmarks further comprises:
depicting a first landmark of the first stereo frame using the VIO system at a first depth value on the two-dimensional disparity map; and
depicting the first landmark of the first stereo frame using the depth map data at a second depth value on the two-dimensional disparity map,
wherein the depth bias value of the first landmark is a difference between the first depth value and the second depth value.

17. The computing apparatus of claim 15, wherein the operations further comprise:
computing statistics of the yaw bias values of a plurality of landmarks in the first stereo frame;
computing a filtered yaw bias value based on the statistics of the yaw bias values;
determining that the filtered yaw bias value exceeds a yaw bias threshold;
in response to determining that the filtered yaw bias value exceeds the yaw bias threshold, updating a total yaw bending estimate for the second stereo frame;
updating a rectification map based on the total yaw bending estimate; and
computing a depth map based on the rectification map.

18. The computing apparatus of claim 11, wherein the VIO system is configured to identify a pose of the flexible device based on sensor data from inertial sensors and optical sensors of the flexible device.

19. The computing apparatus of claim 11, wherein the depth map system determines a depth of a pixel in the first stereo frame based on a triangulation of the pixel depicted in a right side of the first stereo frame and in a left side of the first stereo frame.

20. A non-transitory computer-readable storage medium, the non-transitory computer-readable storage medium including instructions that when executed by a computer, cause the computer to perform operations comprising:
accessing feature data of a first stereo frame that is generated by stereo optical sensors of a flexible device, the feature data generated based on a visual-inertial odometry (VIO) system of the flexible device;
accessing depth map data of the first stereo frame, the depth map data generated based on a depth map system of the flexible device;
estimating a pitch-roll bias and a yaw bias based on the feature data and the depth map data of the first stereo frame by: projecting stereo VIO features of the first stereo frame to a two-dimensional coordinate system, and computing the pitch-roll bias based on a misalignment in the projected stereo VIO features in the two-dimensional coordinate system; and
generating a second stereo frame after the first stereo frame, the second stereo frame based on the pitch-roll bias of the first stereo frame.

* * * * *